INVENTOR.
SAMUEL RUBEN
BY
ATTORNEY

United States Patent Office 3,455,738
Patented July 15, 1969

3,455,738
METHOD OF MAKING RECHARGEABLE CELL HAVING IONICALLY PERMEABLE GEL AND ELECTRODE THEREFOR
Samuel Ruben, 52 Seacord Road,
New Rochelle, N.Y. 10804
Filed Dec. 1, 1965, Ser. No. 528,005
Int. Cl. H01m 35/02, 43/04
U.S. Cl. 136—6                        6 Claims

ABSTRACT OF THE DISCLOSURE

The invention covers a method of making a rechargeable cell in which the spacer-electrolyte interposed between the electrodes is a clear, self-supporting, non-fibrous ionically permeable gel resulting from a low temperature treatment of a fibrous cellulosic spacer with an alkali metal hydroxide.

---

This invention relates to rechargeable cells and, more particularly, to a rechargeable alkaline cell in which the active cathode material is an oxide or hydroxide of nickel and the active anode material is zinc.

Heretofore, considerable difficulties were experienced with rechargeable alkaline cells in which the anode metal was oxidized during discharging and such oxide was reduced to the elementary metal during charging the cell. While cells of the described character performed very satisfactorily during the initial cycles of charging and discharging, their capacity would gradually decrease with each successive cycle and, in extreme cases, the cell would become completely inoperative as the result of internal short circuits between the anode and the cathode. This difficulty was particularly serious with rechargeable cells comprising a zinc anode, an oxygen-yielding cathode, such as an oxide or hydroxide of nickel, and an alkaline electrolyte, such as an alkali metal hydroxide, containing a substantial amount of alkali metal zincate. Upon repeated charging and discharging of such cells, long dendritic growths of zinc would form on the anode. Each charge resulted in further growth of these dendrites which would grow through any porous barrier member or layer and eventually reach the cathode to cause a short circuit.

I have discovered that the difficulties outlined in the foregoing can be reduced in a simple and highly satisfactory manner.

It is an object of the invention to improve rechargeable cells.

It is another object of the present invention to provide an improved alkaline rechargeable cell comprising a zinc anode and a nickel hydroxide cathode capable of a large number of charging and discharging cycles without undue deterioration or decrease in capacity.

It is a further object of the present invention to provide a novel and improved alkaline rechargeable cell, the components of which are completely immobilized with respect to each other and which is capable of being operated in any position.

It is also within the contemplation of the invention to provide a nickel oxide-zinc rechargeable cell having a zincated lithium hydroxide electrolyte, which is low in weight and simple in construction and which may be readily manufactured and sold on a practical and commercial scale at a low cost.

The invention also contemplates a novel method of assembling and low temperature treating cells of the described general type in order to improve the characteristics thereof, specifically to practically eliminate the detrimental effect of dendritic growths on the anode.

Figure 1:
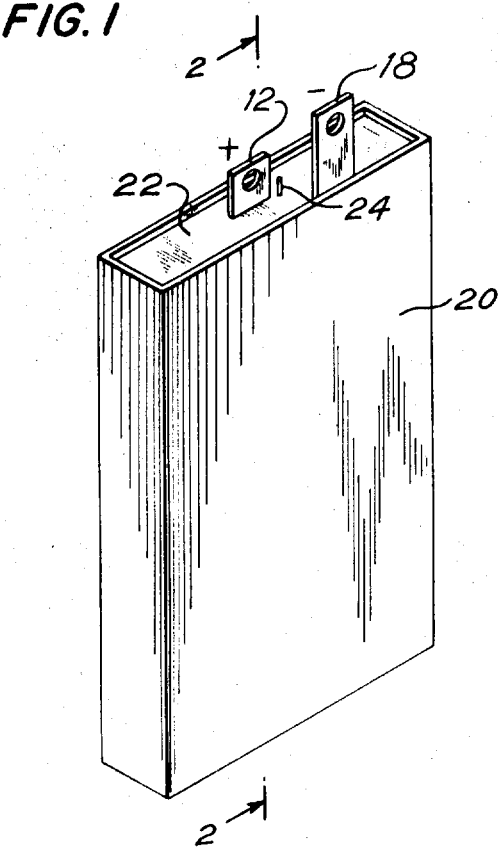
Figure 2:
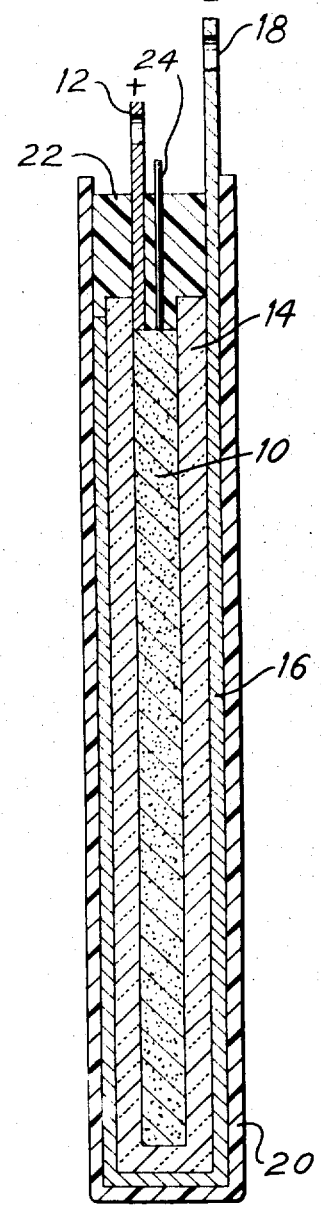

Other and further objects and advantages of the invention will become apparent from the following description, taken in conjunction with the accompanying drawing, in which:

FIG. 1 is a perspective view of a rechargeable cell embodying the principles of the present invention; and
FIG. 2 is a section taken on line 2—2 of FIG. 1.

Broadly stated, the preferred form of the rechargeable cell of the invention comprises the combination of a zinc anode, a nickel oxide cathode deposited in the pores of a porous titanium plaque, and a clear, zincated lithium hydroxide electrolyte gel interposed between said anode and cathode. The gel is produced within the asembled cell by the low temperature reaction of a zincated lithium hydroxide solution with a cellulose paper spacer, such as Dexter paper or Webril. This reaction converts the fibrous and porous spacer layer into a clear, self-supporting and non-fibrous gel electrolyte layer which, although ionically permeable, prevents the extension of dendritic growths of zinc therethrough. Also, it retains the reaction products formed during discharge in close proximity to the zinc anode so that they can be readily redeposited or reduced in metallic form on the anode surface during charge.

The preferred zinc anode is a perforated zinc plate having a thickness of about 0.025" and which has been amalgamated prior to assembly to minimize any local action. However, the zinc anode may take other forms, such as a plaque pressed from amalgamated zinc powder, zinc sprayed on a porous supporting surface, for example on cloth, zinc electrodeposited on a brass screen, or the like.

The cathode plaque used for 1 ampere/hour capacity cells is made from titanium powder which has been sieved —100 and +200 mesh. 5.65 gm. of this powder is filled into a cavity of suitable dimensions in a graphite block or mold and after being leveled off, it is sintered in a vacuum furnace at a temperature between 1000° to 1025° C. for about 15 minutes. The dimensions of the resulting plaque are 1.46" wide, 1.68" long and 0.121" thick, having a volume of 4.9 cc. and a density of 1.5 gm./cc., indicating a highly porous structure. After spot welding a 0.010" thick and 0.5" wide titanium tab or terminal strip to the top portion of the porous plaque, it is vacuum impregnated with a 200 gm. $Ni(NO_3)_2.6H_2O/1100$ cc. $H_2O$ solution. Upon the excess liquid having been drained off, the impregnated plaque is put in an oven maintained at 310° to 375° C., preferably at 330° C., for a period of time sufficient to pyrolytically decompose all of the nitrate to nickel oxide which constitutes a thin, electrically conductive and tenaciously adherent integral layer on all surfaces of the intercommunicating pores. The weight of the pyrolytically produced nickel oxide layer is 0.7 gm. The pyrolytic coating is necessary for the purposes of the present invention because in its absence a polarized layer would be formed between the interface of the titanium base and any depolarizer oxide deposited thereon, thereby greatly increasing the internal resistance of the cell in which such cathode is incorporated.

The porous titanium plaque with the pyrolytically deposited nickel oxide coating thereon is then immersed in a hot nickel nitrate, $Ni(NO_3)_2.6H_2O$, solution maintained at 80° to 90° C. and a cathodic current of about 1.5 amp. is caused to flow for 1 hour between said plaque as the cathode and a nickel anode. This will cathodically deposit in the pores of the titanium plaque about 4.5 grams of nickel hydroxide, $Ni(OH)_2$. It is then placed in a lithium hydroxide solution maintained at 80° C. and containing 12 to 20, preferably 20 gm. of lithium hydroxide for each 100 cc. of water, so that any free nickel nitrate is reduced in situ to the hydroxide. Any surface precipitate is brushed off and the plaque is washed in water to free it from any residual nitrates.

The plaque is then dried and placed in a lithium hydroxide solution containing 20 gm. of lithium hydroxide for each 100 cc. of water and an anodic current is caused to flow between the plaque as the anode and a nickel cathode. The anodic treatment is carried out under the same conditions as the above mentioned cathodic treatment, namely 1.5 amps for 1 hour, which converts the green nickel hydroxide to a black oxide of nickel.

The titanium cathode plaque thus obtained is washed and dried, then wrapped with 10 layers of 0.008" thick Dexter paper. An anode plate of amalgamated zinc is applied to each side of the wrapped plaque and the unit is placed in a plastic container. The unit is vacuum-impregnated with an electrolyte composed essentially of 20 gm. LiOH, 100 gm. $H_2O$ and 4 gm. ZnO. After impregnation, the unit is drained of any free electrolyte and is then placed in a refrigerator for several hours, such as 3 hours, where it is maintained at a temperature between $-10$ and $-20°$ C., preferably at $-15°$ C. This low temperature causes a reaction between the cellulosic spacer (Dexter paper) and the zincated lithium hydroxide which converts the fibrous spacer into a clear, self-supporting non-fibrous gel. While this gel possesses adequate ionic conductivity for the reversible action required in a rechargeable cell, it is sufficiently non-porous to restrict the formation of interelectrode bridging paths constituted by dendritic zinc growths and to retain the reaction products of zinc formed during discharge in proximity to the anode. A cell comprising a cathode of the dimensions and type described in the foregoing, a zinc anode and a zincated lithium hydroxide electrolyte has a capacity of 1 ampere hour and an open circuit potential of 1.8 volts. It is capable of a large number of cycles with little change in characteristics. While zinc, specifically amalgamated zinc, is the preferred anode material, other materials, such as porous cadmium or porous iron, may be used where the lower output voltage is not objectionable. Also, while lithium hydroxide, containing practically all the zinc oxide it is capable of dissolving, is the preferred electrolyte, other zincated alkali metal hydroxides, such as potassium hydroxide or sodium hydroxide, can be used although the results are inferior to those obtained with lithium hydroxide. It is further to be noted that the concentration of the various solutions used in processing the cathode plaque, or as the electrolyte, may be subject to variations as those skilled in the art will readily understand.

In preparing the cathode of the invention, the rate of cathodic deposition can be followed by noting the potential change across the cathode and a nickel anode. For example, with the cathodes of the described type and size, the initial potential is 2.3 volts while after 1.5 ampere hours of cathodic deposition it is 4.5 volts. Although nickel nitrate, $Ni(NO_3)_2.6H_2O$ is the electrolyte most commonly used for the deposition of $Ni(OH)_2$, other nickel salts, such as nickel chloride in a sodium hypochlorite solution, can be used.

After the cell has been completely assembled with the plastic container and the spacer-electrolyte has been converted to a clear, self-sustaining and non-fibrous gel by the described low temperature treatment, the open-ended top portion of the container from which the electrode terminals extend is filled with an epoxy resin, such as Araldite, which solidifies to a hard compound, sealing the cell components from atmospheric effects and also preventing displacement of such components with respect to each other. In order to provide a gas venting or diffusion path through the top seal of epoxy resin, a cotton cord or twine that has been treated with silicone resin is inserted with one end in contact with the top of the cell unit and with its other end slightly extending above the epoxy resin seal. Due to the silicone impregnation of the cord, the epoxy resin does not seal to it but merely around it, thus providing a venting or gas diffusing path. This path is effective in releasing excessive internal pressure which may be produced upon greatly overcharging the cell.

As mentioned in the foregoing, the open circuit potential of the cell of the invention is initially 1.8 volts. The discharge will have a flat characteristic, provided that the cell is operated within the limits of the cathode capacity.

Referring now to the drawing, the structural organization of a preferred form of the invention will be described. Reference numeral 10 denotes the cathode constituted by a porous titanium plaque impregnated with nickel oxide and having a terminal strip 12 of titanium spot welded to the top portion thereof. A gel spacer-electrolyte layer 14, resulting from low temperature treatment of Dexter paper impregnated with zincated lithium hydroxide electrolyte, surrounds cathode 10. The anode 16 is in the form of a perforated U-shaped plate of amalgamated zinc having a terminal strip 18 integrally formed therewith.

The cell unit is slipped into rectangular container 20 of nylon or of some other suitable plastic from which terminal strips 12 and 18 extend. Thereupon the top portion of the said container, as well as any space remaining at the inner sides thereof, is filled with an epoxy resin 22 which upon hardening seals the cell and also immobilizes the cell components with respect to each other. A short piece of a silicone treated cord or twine 24 is inserted in the epoxy resin top seal while it is still liquid and, as it does not adhere to the epoxy resin, will constitute a venting path therearound for releasing excessive internal pressure.

Although the present invention has been described in connection with a preferred embodiment thereof, variations and modifications may be resorted to by those skilled in the art without departing from the principles of the invention. Thus, while titanium is the preferred sintered porous metal base for the cathode, other materials can be used with the gelled type assembly, such as sintered nickel powder, or a porous carbon plaque in which cases the preliminary coating of the pore surfaces by pyrolysis of nickel nitrate need not be used. Although the pyrolysis of nickel nitrate to produce an integral residual layer of nickel oxide gives the most compatible base for the electrodeposited nickel hydroxide, other conductive coatings may be used for the purpose, such as coatings of manganese dioxide produced by pyrolytic decomposition of manganous nitrate. Furthermore, while nickel hydroxide is the preferred material to be cathodically electrodeposited in the pores of the porous titanium plaque, it has been found that cobalt hydroxide, $Co(OH)_2$, can be deposited by the identical process providing an operating cathode for alkaline cells having a lithium hydroxide electrolyte. For best results, it is desirable, however, to employ a pyrolytically produced integral coating by vacuum impregnating the plaque in a 50% solution of cobalt nitrate, $Co(NO_3)_2.6H_2O$, and heating the impregnated plaque to pyrolysis temperature. The plaque thus obtained can then be impregnated with cobalt hydroxide by cathodic deposition in a saturated solution of cobalt nitrate composed of 136 gm. of $Co(NO_3)_2.6H_2O$ per 100 cc. of water at room temperature. All of these variations and modifications are considered to be within the true spirit and scope of the present invention, as disclosed in the foregoing description and defined by the appended claims.

What is claimed is:

1. The method of making a rechargeable cell which comprises providing an oxygen-yielding cathode and an anode, interposing a spacer layer of fibrous cellulosic material between said cathode and anode, impregnating said spacer layer with a zincated alkali metal hydroxide, and then cooling said cell to a low temperature for a period sufficient to convert the initially fibrous spacer to a clear, self-supporting non-fibrous and ionically permeable gel.

2. The method of making a rechargeable cell as claimed in claim 1, wherein the cathode is in the form of a sintered titanium body having a first layer of an oxide of a metal selected from the group consisting of nickel and cobalt pyrolytically formed in the pores thereof and having another layer of an oxide of said metal electrodeposited on said first layer, and wherein the anode is amalgamated zinc.

3. The method of making a rechargeable cell as claimed in claim 1, wherein the low temperature to which the cell is cooled is between $-10°$ and $-20°$ C.

4. The method of making a rechargeable cell as claimed in claim 1, wherein the spacer layer of fibrous cellulosic material is one selected from the group consisting of Dexter paper and Webril.

5. The method of making a cathode for rechargeable cells which comprises providing a cathode support in the form of a sintered body of titanium characterized by a multiplicity of intercommunicating pores, pyrolytically forming a first layer of an oxide of a metal selected from the group consisting of nickel and cobalt on the surface of said pores, cathodically depositing a second layer of a hydroxide of said metal on said first layer, and anodically converting said hydroxide layer to an electrochemically active oxide.

6. The method of making a cathode for rechargeable cells as claimed in claim 5, wherein the cathodic deposition is carried out in a hot nickel nitrate solution and the subsequent anodic treatment is carried out in a lithium hydroxide solution.

References Cited

UNITED STATES PATENTS

| 3,265,632 | 8/1966 | Leach | 252—316 |
|---|---|---|---|
| 2,422,045 | 6/1947 | Ruben | 136—107 |
| 2,576,266 | 11/1951 | Ruben | 136—157 |
| 2,586,426 | 2/1952 | Grusell et al. | 136—107 |
| 3,057,942 | 10/1962 | Smith et al. | 136—6 |
| 3,114,659 | 12/1963 | Warren | 136—178 |
| 3,216,859 | 11/1965 | Duncan | 136—6 |

WINSTON A. DOUGLAS, Primary Examiner

A. SKAPARS, Assistant Examiner

U.S. Cl. X.R.

136—24, 75, 100, 148; 204—38; 252—316